United States Patent
Nguyen et al.

(10) Patent No.: US 10,969,508 B2
(45) Date of Patent: Apr. 6, 2021

(54) AUTOMATED MISTIE ANALYSIS AND CORRECTION ACROSS TWO-DIMENSIONAL ("2D") SEISMIC SURVEYS

(71) Applicant: Landmark Graphics Corporation, Houston, TX (US)

(72) Inventors: Nam Xuan Nguyen, Katy, TX (US); William John May, Calgary (CA); Eugene Carey Heinrichs, Calgary (CA)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 15/748,328

(22) PCT Filed: Aug. 22, 2017

(86) PCT No.: PCT/US2017/047952
§ 371 (c)(1),
(2) Date: Jan. 29, 2018

(87) PCT Pub. No.: WO2018/093432
PCT Pub. Date: May 24, 2018

(65) Prior Publication Data
US 2020/0088899 A1 Mar. 19, 2020

Related U.S. Application Data

(60) Provisional application No. 62/424,333, filed on Nov. 18, 2016.

(51) Int. Cl.
*G01V 1/36* (2006.01)
*G01V 1/30* (2006.01)

(52) U.S. Cl.
CPC ............. *G01V 1/36* (2013.01); *G01V 1/301* (2013.01); *G01V 2210/53* (2013.01); *G01V 2210/643* (2013.01); *G01V 2210/74* (2013.01)

(58) Field of Classification Search
CPC ...... G01V 1/36; G01V 1/301; G01V 2210/53; G01V 2210/643; G01V 2210/74
See application file for complete search history.

(56) References Cited

U.S. PATENT DOCUMENTS 5,132,938 A * 7/1992 Walters .................... G01V 1/28
367/38
5,587,942 A 12/1996 Krebs
(Continued)

FOREIGN PATENT DOCUMENTS

| CN | 102663737 A | * | 9/2012 |
| CN | 102323617 B | | 3/2014 |
| CN | 109325987 A | * | 2/2019 |

OTHER PUBLICATIONS

T. N. Bishop and et al, "Correcting amplitude, time, and phase mis-ties in seismic data", Geophysics, vol. 59, No. 6 (Jun. 1994); p. 946-953 (Year: 1994).*

(Continued)

*Primary Examiner* — Alexander Satanovsky
*Assistant Examiner* — Douglas Kay
(74) *Attorney, Agent, or Firm* — Haynes and Boone, LLP

(57) ABSTRACT

Systems and methods to correct misties across multiple 2D seismic surveys using a correction solution calculated based only on the intersecting points between different surveys.

15 Claims, 8 Drawing Sheets

(56) References Cited

U.S. PATENT DOCUMENTS

| | | | |
|---|---|---|---|
| 6,041,018 A | 3/2000 | Roche | |
| 9,810,801 B2* | 11/2017 | Kim | G01V 1/38 |
| 2005/0229508 A1* | 10/2005 | Cervone | G01V 1/008 |
| | | | 52/167.1 |
| 2012/0158382 A1 | 6/2012 | Grandi | |
| 2015/0006083 A1 | 1/2015 | McAuliffe et al. | |
| 2015/0285931 A1 | 10/2015 | Keskes et al. | |
| 2016/0299244 A1* | 10/2016 | Kim | G01V 1/3808 |
| 2018/0335533 A1* | 11/2018 | Xia | G01V 1/306 |

OTHER PUBLICATIONS

J. Stein and et al, "New Inversion Methodology Improves Tie Lines Matches on 2D Surveys", SEG Houston 2009 International Exposition and Annual Meeting (Year: 2009).*

International Search Report and the Written Opinion of the International Search Authority, or the Declaration, dated Nov. 28, 2017, PCT/US2017/047952, 9 pages, ISA/KR.

Office Action issued for Canadian Patent Application No. 3,036,796, dated May 1, 2020, 5 pages.

* cited by examiner

AUTOMATED MISTIE ANALYSIS AND CORRECTION ACROSS TWO-DIMENSIONAL ("2D") SEISMIC SURVEYS

PRIORITY

The present application is a U.S. National Stage Patent Application of International Patent Application No. PCT/US2017/047952, filed Aug. 22, 2017, which claims the benefit of U.S. Provisional Application No. 62/424,333, filed Nov. 18, 2016, both entitled "AUTOMATED MISTIE ANALYSIS AND CORRECTION ACROSS TWO-DIMENSIONAL (2D) SEISMIC SURVEYS," also naming Nguyen et al. as inventors, the disclosures of which are incorporated herein by reference in their entirety.

FIELD OF THE DISCLOSURE

The present disclosure relates generally to seismic interpretation and, more specifically, to a system and method for correcting seismic imaging misties across multiple two-dimensional ("2D") surveys.

BACKGROUND

In the oil and gas industry, seismic reflection surveys can reveal many structural details about a subterranean formation, including the location of subterranean faults, mineral deposits, and the like. It is desirable to accurately image and model the location and extent of these geologic structures for commercial applications. For example, in hydrocarbon exploration, it is important to accurately model geological structures within the subsurface formation for purposes of identifying areas of the formation in which significant amounts of oil and gas may be trapped.

A common and widely used technique for generating seismic images of a geological structure from 2D seismic reflection surveys is to define the boundaries of the structure using horizons or height fields. The data representing the horizons is usually stored and processed by imaging software using a 2D array, or grid, where the elements in the grid represent points along 2D lines on the surface of the geological structure in the horizontal direction (i.e., X and Y axes), and the value contained in each element indicates the depth (i.e., Z axis) of the boundary at that point.

A 2D seismic survey contains a logical set of lines (also known as lines of geophone that record the reflection of seismic energy) that are acquired and processed at the same time, for example, by applying the same parameters to derive a seismic image with a good match across the lines. However, the seismic differences (or "misties") of the seismic image are generally observed at points where 2D seismic lines from different seismic surveys intersect. The seismic misties at the intersection are revealed as discontinuities in the seismic image, which may lead to inconsistencies in the seismic interpretation of subsurface geological formations.

Conventional mistie correction techniques have a number of disadvantages. For example, conventional mistie analysis generally involves computing misties and applying corrections to each of the 2D lines separately. However, this requires very extensive computations to be performed at every line intersection. Additionally, correcting misties one line at a time may introduce even more misties across other 2D lines within the same 2D survey. Furthermore, conventional solutions for correcting misties typically require a user to apply the correction multiple times, which can be a very time-consuming and tedious process.

DESCRIPTION OF ILLUSTRATIVE EMBODIMENTS

Figure 1:
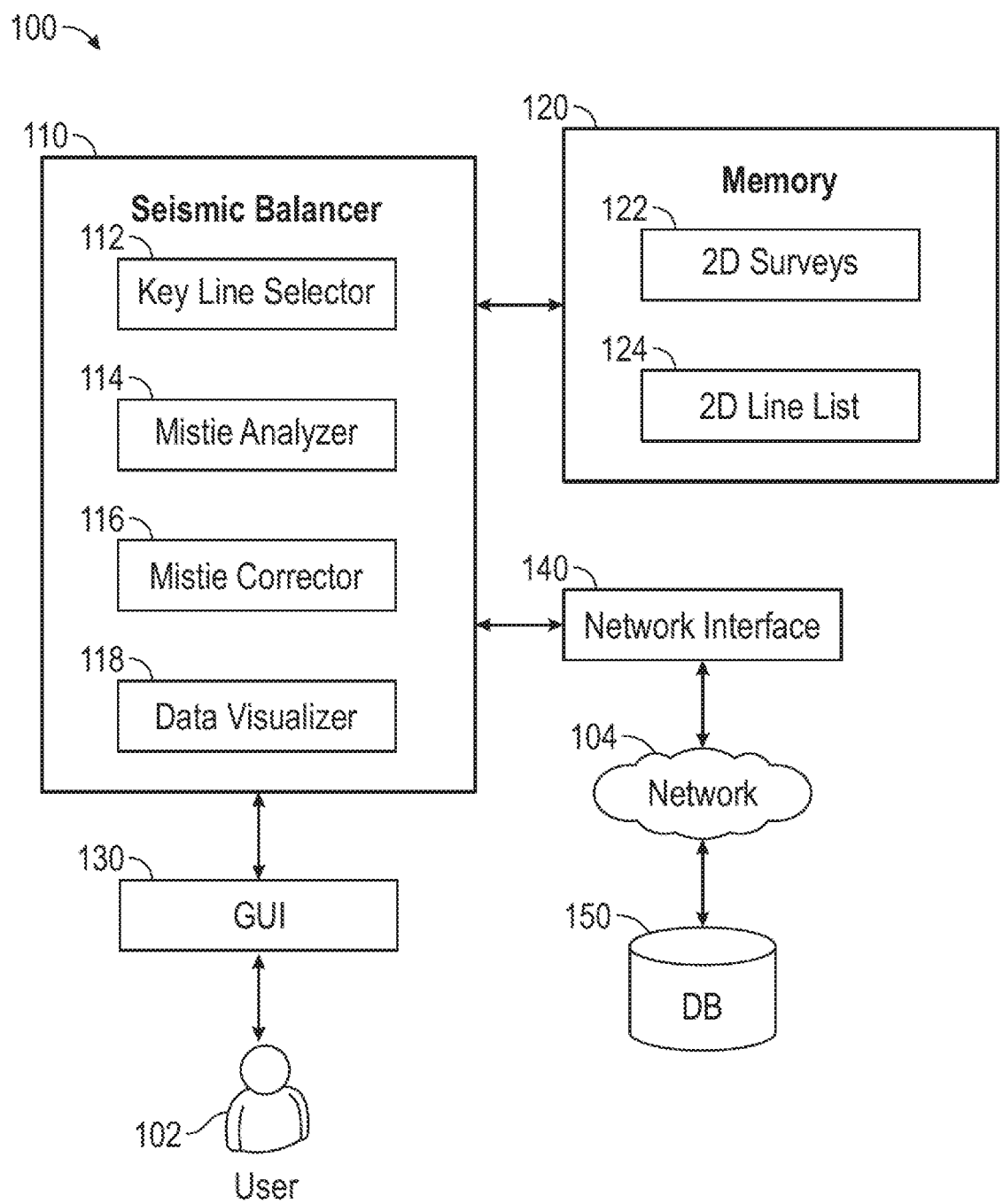
FIG. 1 is a block diagram of an illustrative system for automated mistie analysis and correction across 2D seismic surveys.

Illustrative embodiments and related methods of the present disclosure are described below as they might be employed in systems and methods to correct misties across multiple 2D seismic surveys. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of this disclosure will become apparent from consideration of the following description and drawings.

As described herein, illustrative systems and methods of the present disclosure are directed to the correction of misties across multiple 2D seismic surveys. In a generalized method, a processing system obtains a plurality of seismic surveys wherein lines of each individual survey are acquired and processed simultaneously and at a time different from the lines of other surveys. As defined herein, a "survey" is a logical set of lines acquired and processed simultaneously to allow line-to-line tying of the seismic data, in addition to mapping and interpretation of subsurface structures. Thus, in the generalized method, lines of an individual survey are acquired simultaneously, but different surveys are acquired at different times. After acquisition of the surveys, the system identifies key lines for each survey as a plurality of lines of one survey that intersect with lines of a different survey. The system then identifies intersecting points between the key lines and lines of the different survey. Misties between the key lines and intersected lines of the different survey are then identified. The system then calculates a correction solution using only the intersecting points between the key lines and intersected lines of the different survey. The correction solution is then applied to correct the misties in the seismic image.

As will be described in further detail below, the disclosed embodiments may be used to facilitate seismic interpretation by improving the accuracy of seismic mistie analysis across a large number (e.g., hundreds or thousands) of 2D lines across multiple 2D seismic surveys. The disclosed mistie analysis techniques may take into account critical information from 2D surveys to optimize computation run-time and quality. By applying optimal corrections (e.g., shift, phase, gain corrections) to resolve misties for all lines in the same 2D survey or across multiple 2D surveys, the disclosed techniques improve system performance and efficiency while avoiding repeated work. In contrast with conventional solutions for mistie correction, the disclosed techniques prevent any new misties from being introduced while correcting existing misties and optimizing the use of available processing bandwidth.

FIG. 1 is a block diagram of an illustrative system 100 for automated mistie analysis and correction across 2D seismic surveys. As shown in FIG. 1, system 100 includes a seismic balancer 110, a memory 120, a graphical user interface ("GUI") 130, and a network interface 140. In one or more embodiments, seismic balance 110, memory 120, GUI 130, and network interface 140 may be communicatively coupled to one another via an internal bus of system 100. Although only seismic balancer 110, memory 120, GUI 130, and network interface 140 are shown in FIG. 1, it should be appreciated that system 100 may include additional components, modules, and/or sub-components as desired for a particular implementation.

System 100 can be implemented using any type of computing device having at least one processor and a non-transitory computer-readable storage medium for storing data and instructions executable by the processor. Examples of such a computing device include, but are not limited to, a mobile phone, a personal digital assistant ("PDA"), a tablet computer, a laptop computer, a desktop computer, a workstation, a server, a cluster of computers, a set-top box, or other type of computing device. Such a computing device may also include an input/output ("I/O") interface for receiving user input or commands via a user input device (not shown). The user input device may be, for example and without limitation, a mouse, a QWERTY or T9 keyboard, a touch-screen, a graphics tablet, or a microphone. The I/O interface also may be used by the computing device to output or present information via an output device (not shown). The output device may be, for example, a display coupled to or integrated with the computing device for displaying a digital representation of the information being presented to the user. The I/O interface in the example shown in FIG. 1 may be coupled to GUI 130 for receiving input from a user 102 and displaying information and content to user 102 based on the received input. GUI 130 can be any type of GUI display coupled to system 100.

Memory 120 can be used to store information accessible by seismic balancer 110 and its components for implementing the illustrative functionalities of the present disclosure. Memory 120 may be any type of recording medium coupled to an integrated circuit that controls access to the recording medium. The recording medium can be, for example and without limitation, a semiconductor memory, a hard disk, or similar type of memory or storage device. In some implementations, memory 120 may be a remote data store, e.g., a cloud-based storage location, communicatively coupled to system 100 over a network 104 via network interface 140.

Network 104 can be any type of network or combination of networks used to communicate information between different computing devices. Network 104 can include, but is not limited to, a wired (e.g., Ethernet) or a wireless (e.g., Wi-Fi or mobile telecommunications) network. In addition, network 104 can include, but is not limited to, a local area network, medium area network, and/or wide area network such as the Internet.

In one or more illustrative embodiments, seismic balancer 110 includes a key line selector 112, a mistie analyzer 114, a mistie corrector 116 and a seismic data visualizer 118. Seismic balancer 110 analyzes the data in the seismic surveys in order to perform the illustrative methods of the present disclosure. Many conventional functionalities of seismic balancer will not be explained in detail herein, as those functionalities will be understood by those ordinarily skilled in the art having the benefit of this disclosure. Such functionalities are similar to those provided by, for example, the DecisionSpace® Geoscience suite commercially available through Landmark Graphics Corporation of Houston, Tex.

Still referring to FIG. 1, key line selector 112 identifies intersection points for each logical line within an individual 2D seismic survey. The 2D seismic survey may be one of a plurality of 2D surveys 122 stored in memory 120. Surveys 122 may have been obtained from a seismic acquisition operation. A 2D line list 124 of all of the lines associated with each 2D survey may also be stored in memory 120 and processed by key line selector 112. Each intersection point identified by key line selector 112 for each line represents seismic data at an intersection of the corresponding line in the seismic survey and another line from a different seismic survey. As will be discussed below, in certain illustrative embodiments, a key line is a line which has been identified by key line selector 112 as having a predefined number, or relative number, of intersecting points. For example, a chosen key line may be the line in a survey which has the least or most number of intersecting points with lines of a different survey.

Thus, in certain illustrative embodiments, key line selector 112 may first select a subset of the lines based on a count of the intersection points identified for each line in the plurality of lines. The subset of lines may be those that intersect with lines of the same survey or lines of different surveys. Thereafter, key line selector 112 then selects a key line for each survey from among the generated subset of lines, based on the count of the intersection points with lines of different surveys, as will be discussed in more detail below.

Mistie analyzer 114 identifies misties based on a correlation of the intersection points of the selected key line with lines from different seismic surveys within 2D surveys 122. Here, mistie analyzer 114 cross-correlates seismic data at the intersecting points of the key lines and the intersected lines of the different surveys to derive the misties. To perform this correlation, system 100 cross-correlates the seismic traces from each line at an intersection to identify the misties as the recommended corrections (e.g., shift, phase, gain) that are require to achieve the best correlation between two intersected lines.

Once the misties are identified, mistie corrector 116 calculates a correction solution for each 2D survey solely based on the intersection points between the key lines and the intersected lines of different surveys based upon the misties. In certain illustrative methods, to calculate the correction solution, system 100 assigns intersecting points between the key lines of an individual survey and the intersected lines of the different survey as an optimization set. The identified misties (e.g., shift, phase, gain) may be processed by a least-square optimizer to determine the optimum correction solution for each survey that will result in the best overall solution for all surveys. Mathematically, the least-squares approach "distributes" corrections among the optimization sets so that the minimum misties are observed throughout the entire dataset.

Once the correction solution has been calculated by mistie corrector 116, system 100 applies the correction solution to correct the misties. The seismic data is now ready to be visualized. Data visualizer 118 is then used to generate a visualization of the seismic data from the 2D seismic surveys. The visualization may be displayed within a visualization window of GUI 130. GUI 130 and the information displayed therein may be presented to a user 102 via a display device (not shown) coupled to system 100.

User 102 may use a user input device (e.g., a touchscreen, microphone, keyboard, mouse or other type of pointing device) coupled to system 100 to interact directly with the displayed representation of the seismic data after performing seismic interpretation. The seismic images may then be used to perform a variety of wellbore operations.

Figure 2A:
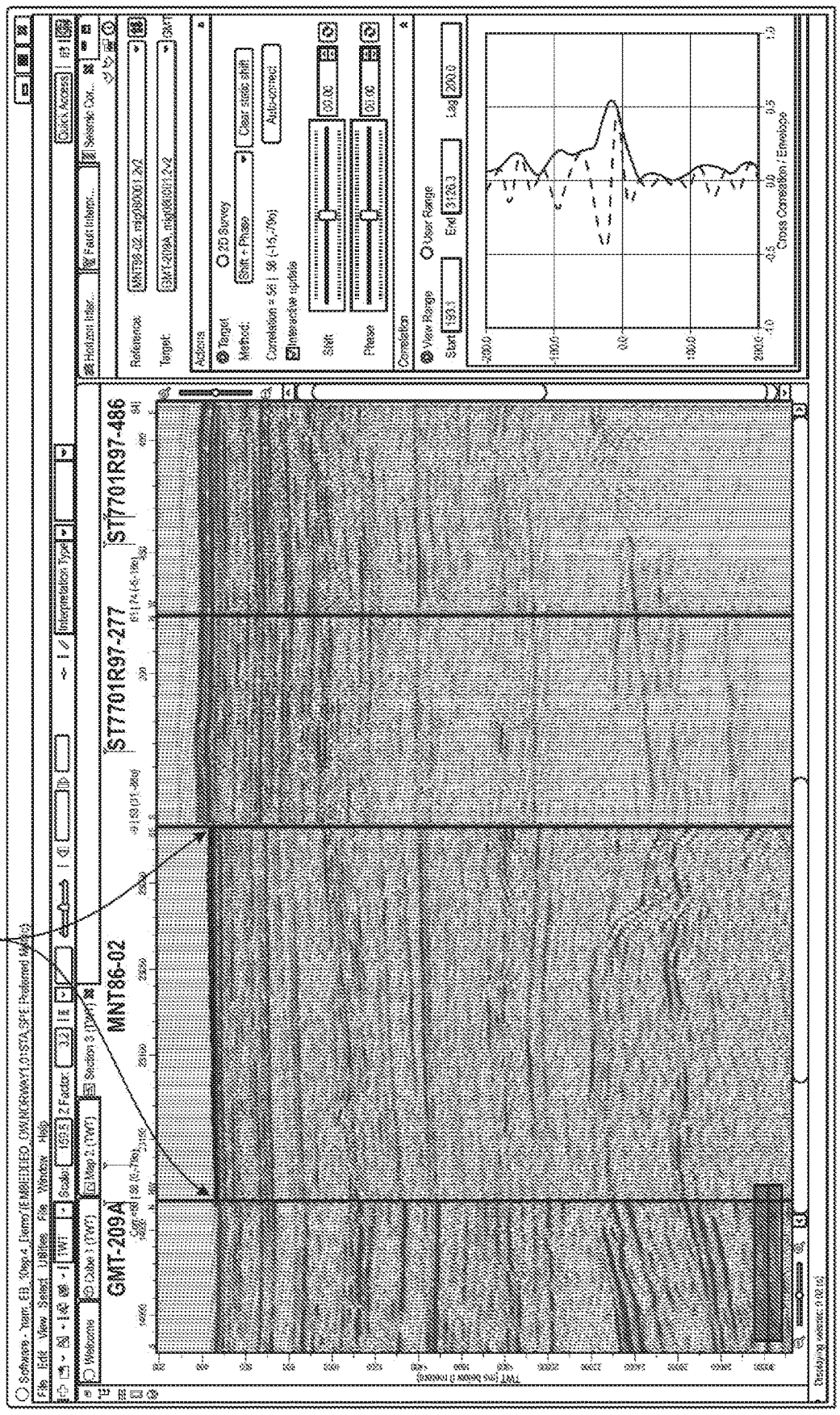
FIGS. 2A-B are different views of an illustrative graphical user interface ("GUI") of a seismic interpretation application.
Figure 2B:
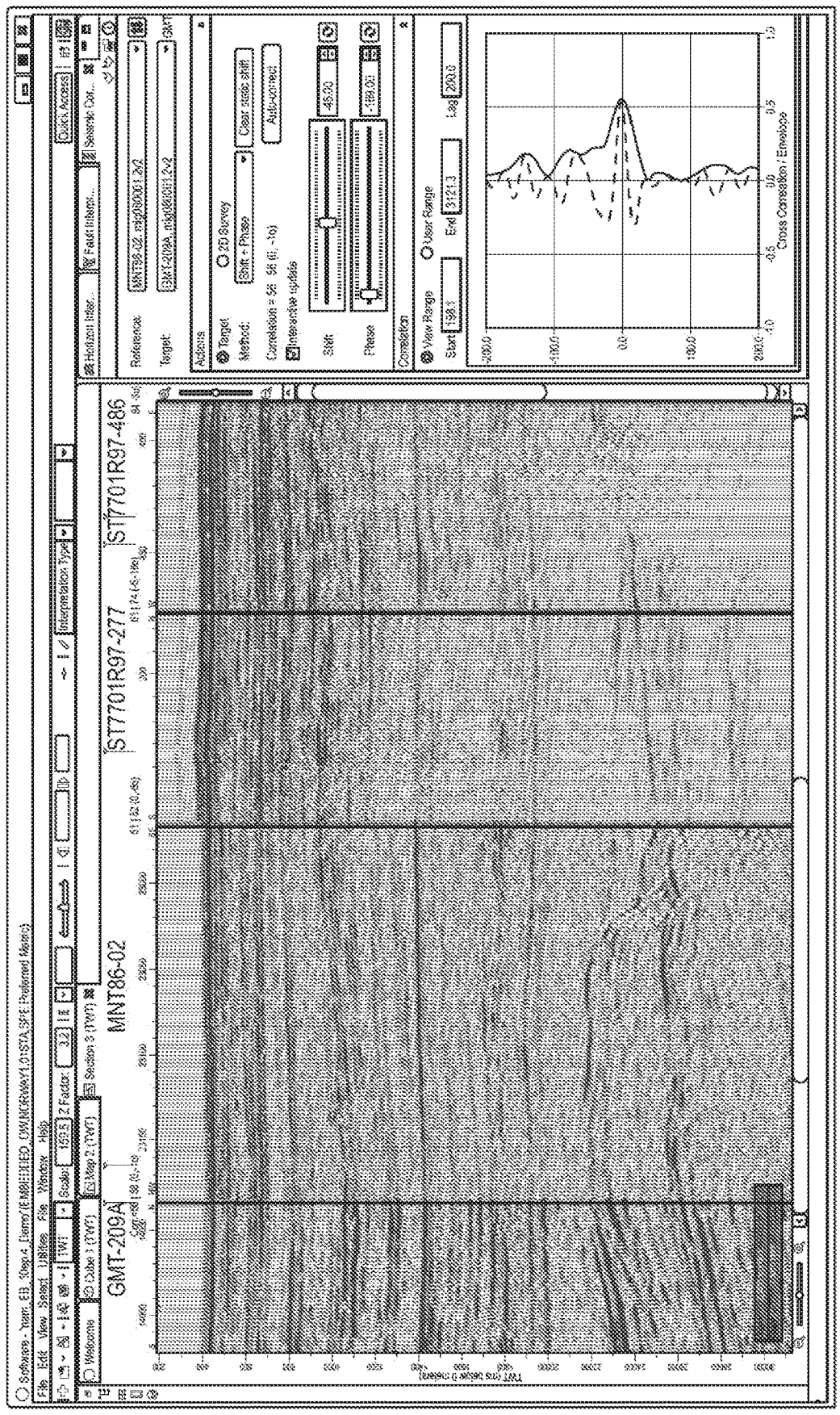
Figure 3:
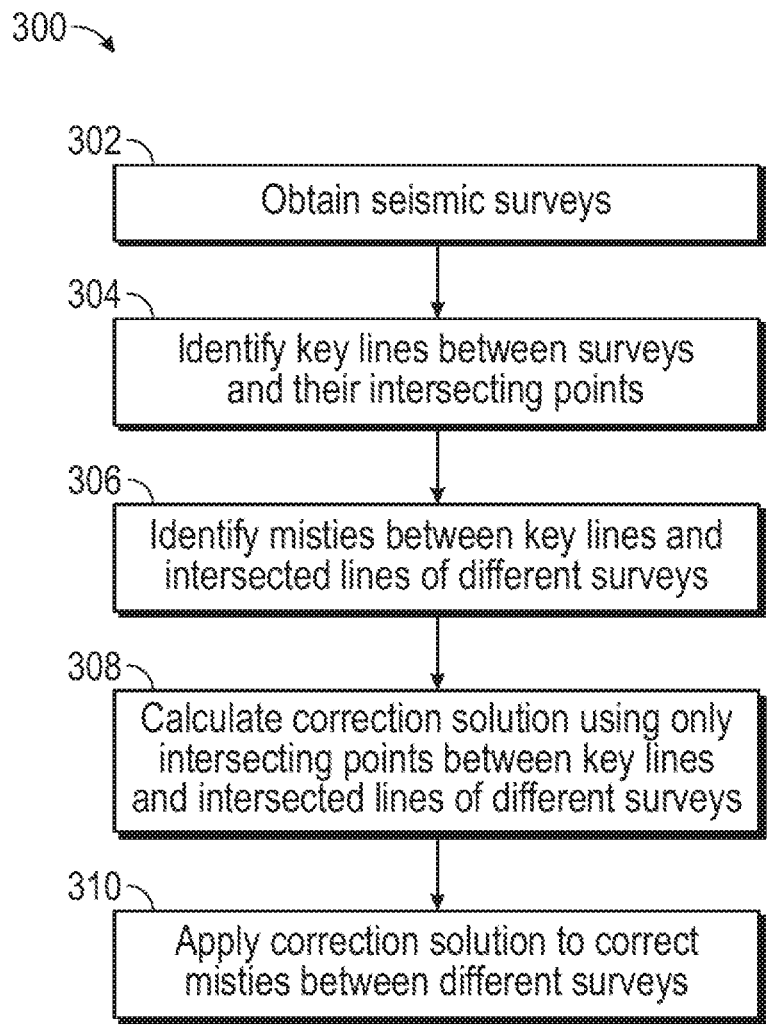
FIG. 3 is a flow chart of a generalized method 300 for correcting misties across multiple 2D seismic surveys, according to certain illustrative methods of the present disclosure.

FIGS. 2A-B are different views 200A and 200B of GUI 130 in which seismic data is displayed within a visualization window before and after mistie correction, respectively, according to certain illustrative methods of the present disclosure. As can be seen in FIG. 2A, there are noticeable seismic misties observed at the intersections between lines from different surveys: GMT-209A and MNT86-02 lines in addition to ST7701R97-486 and ST7701R97-277. The misties have been corrected as shown in FIG. 2B. As can be seen, the seismic image is continuously followed across the intersections of these lines which were previously problematic. FIG. 3 is a flow chart of a generalized method 300 for correcting misties across multiple 2D seismic surveys, according to certain illustrative methods of the present disclosure. At block 302, system 100 obtains a plurality of seismic surveys for analysis of a hydrocarbon bearing formation. As previously discussed, each individual seismic survey is comprised of logical lines which are acquired and processed simultaneously. For example, a first survey is acquired and processed using a logging tool. The seismic data contained within the survey is acquired and processed simultaneously as logical lines, thus forming the first survey. Then, using the same logging tool positioned at a different depth along the wellbore, a second survey is acquired and processed in the same manner. Thus, the lines in a given survey are acquired and processed simultaneously, but the surveys themselves are acquired at different times.

At block 304, using key line selector 112, seismic balancer 110 then identifies key lines for each survey and their intersecting points. Here, as will be discussed in more detail below, the key lines are identified as those lines of an individual survey which intersect with lines of a different survey. The intersecting points are the points where the key lines and intersected lines intersect one another, and a user specified number of seismic traces from each line will be selected to represent the seismic data at the intersection.

At block 306, using mistie analyzer 114, seismic balancer 110 identifies the misties between the key lines and the intersected lines of different surveys. As will be discussed below, the misties are identified by cross-correlating the seismic data at the intersecting points of the key lines and the intersected lines. The misties are essentially datasets having correlation coefficients and three components: a phase, gain, and shift correction component. At block 308, using mistie corrector 116, seismic balance 110 calculates a correction solution using only the intersecting points between the key lines and the intersected lines of the different survey. The correction solution is also a dataset comprised of a phase, gain and shift component which corrects the misties for each survey while minimizing the overall misties for all surveys. Then, at block 310, using data visualizer 118, seismic balancer 110 applies the correction solution to correct the mistes between the key lines and intersected lines of the different survey. In certain illustrative methods, the correction solution is only applied to correct misties between surveys. However, in other illustrative methods, the correction solution may also be applied to correct misties between lines in an individual survey.

Figure 4A:
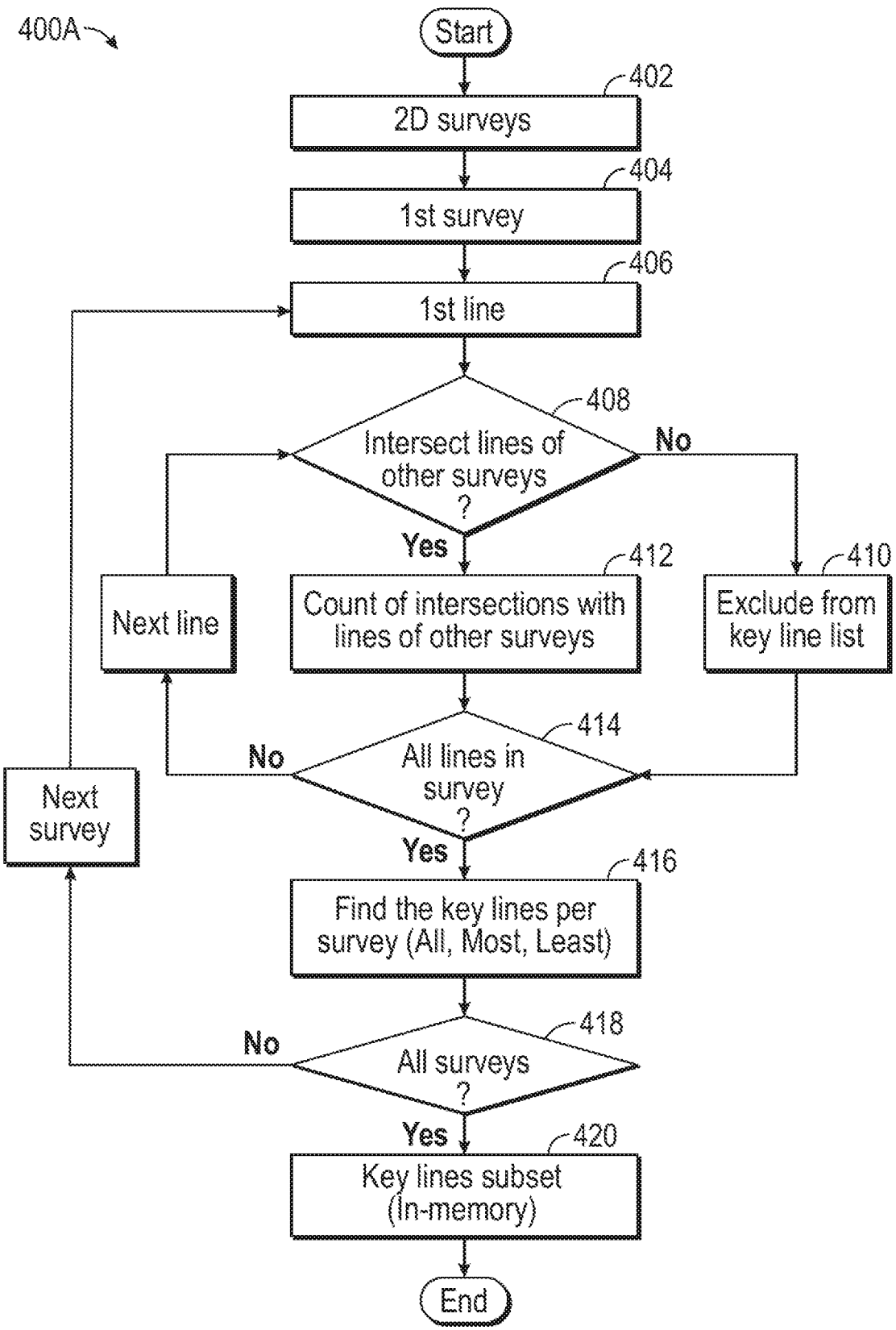
FIG. 4A is a method 400A for identifying key lines at block 304 of method 300.

Now that the generalized method 300 has been discussed, a more detailed discussion of the features of the present disclosure will be provided. FIG. 4A is a method 400A for identifying key lines at block 304 of method 300. At block 402, a plurality of surveys is received by seismic balancer 110, whereby a first survey is extracted for processing at block 404. Within the first survey, each logical line will be analyzed, starting with the first line at block 406. At block 408, seismic balancer 114 determines whether the first line intersects a line of that same survey or a line of a different survey. If it is determined the line does not intersect the line of a different survey, the line is excluded from the line list (which is being generated) at block 410. If, however, it is determine the line does intersect the line of a different survey, the number of intersections along the line are counted at block 412.

At block 414, regardless of whether the line intersects a line of a different survey, seismic balancer 110 determines whether all lines of the survey being analyzed have been processed. If the determination is no, the method proceeds to the next logical line and loops back to block 408 and begins again. However, if all lines in the individual survey being analyzed have been processed, seismic balancer 110 selects the key lines at block 416. In various illustrative methods, different criteria may be used to select key lines. For example, key lines may be selected as those lines having any intersection with lines of a different survey. Alternatively, key lines may be the line having the most number of intersections with another survey. In yet another example, the key lines may be the line having the least number of intersections with another survey. Nevertheless, at block 416, any one or more of these criteria are applied to identify the key lines for inclusion into the key line list being generated.

Once the key line(s) have been selected at block 416, seismic balancer then determines whether all surveys have been analyzed at block 418. If the determination is no, the system proceeds to the next survey and loops back to block 406. If, however, the determination is yes, the method proceeds to block 420 where the key line list is generated and stored in memory 120 (FIG. 1). At block 420, the key line list is identified as a key lines subset because all lines meeting the criteria applied at block 416 are included in the list.

Figure 4B:
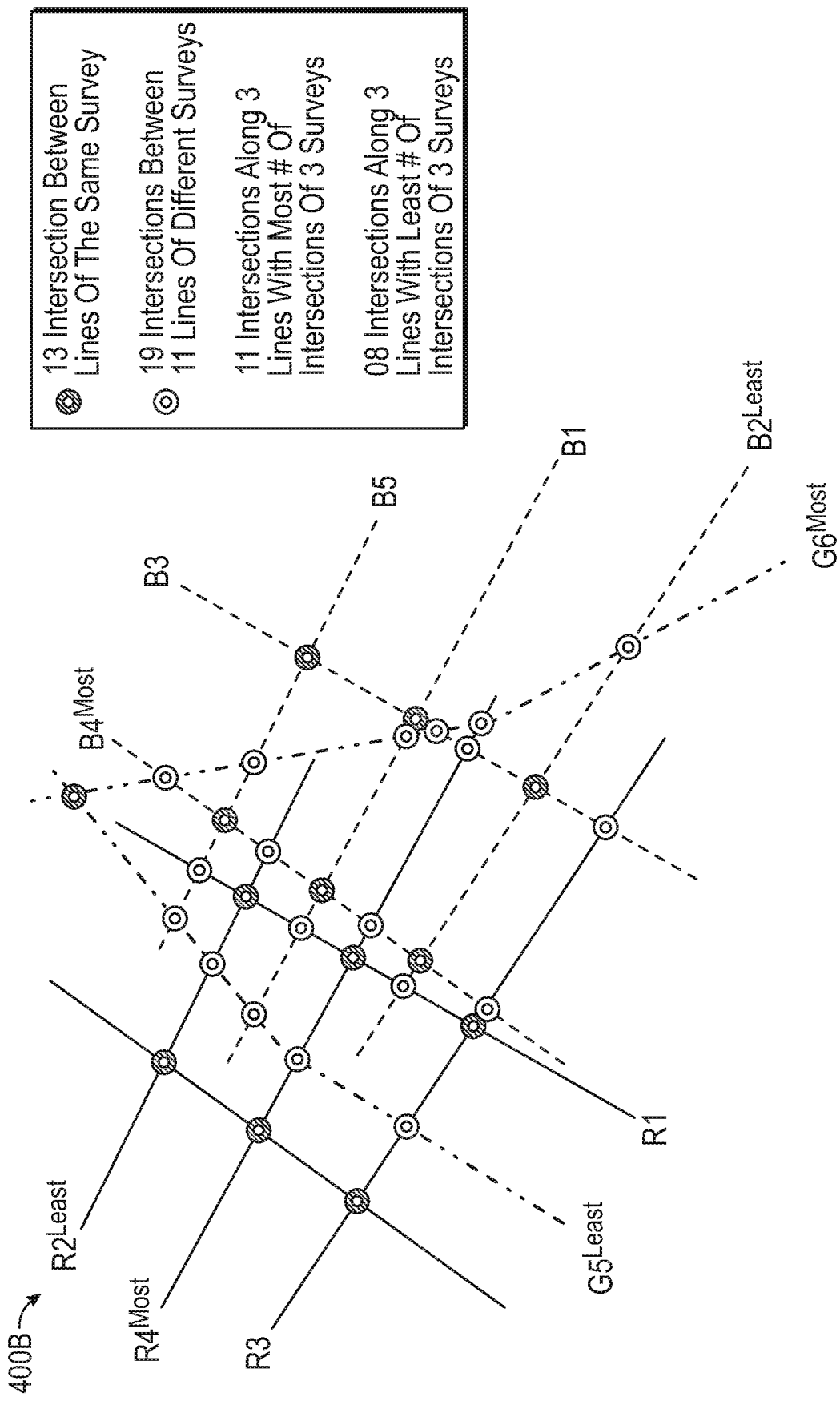
FIG. 4B is a diagram of illustrative intersecting points between logical lines from three different seismic surveys, and is useful to illustrate method 400A.

FIG. 4B is a diagram of illustrative intersecting points between logical lines from three different seismic surveys, and is useful to illustrate method 400A. In FIG. 4A, three surveys are illustrated: survey R, survey B, and survey G. In addition, the intersection points between lines of the same survey and lines of different surveys are illustrated. For each survey, the line having the most number of intersecting points is identified, and the line having the least number of intersecting points is identified. For example, line R4 (of survey R) has 4 intersecting points with lines of different surveys. When compared with the other lines of survey R, line R4 has the most intersecting points with different surveys. Thus, line R4 is identified as the key line of survey R (assuming a "most" criteria were applied to select key lines). Also, line B2 (of survey B) has 2 intersecting points with lines of other surveys. When compared with the other lines of survey B, line B2 has the least intersections with other surveys, so it has been identified as the key line (assuming a "least" criteria were applied to select key lines).

Figure 4C:
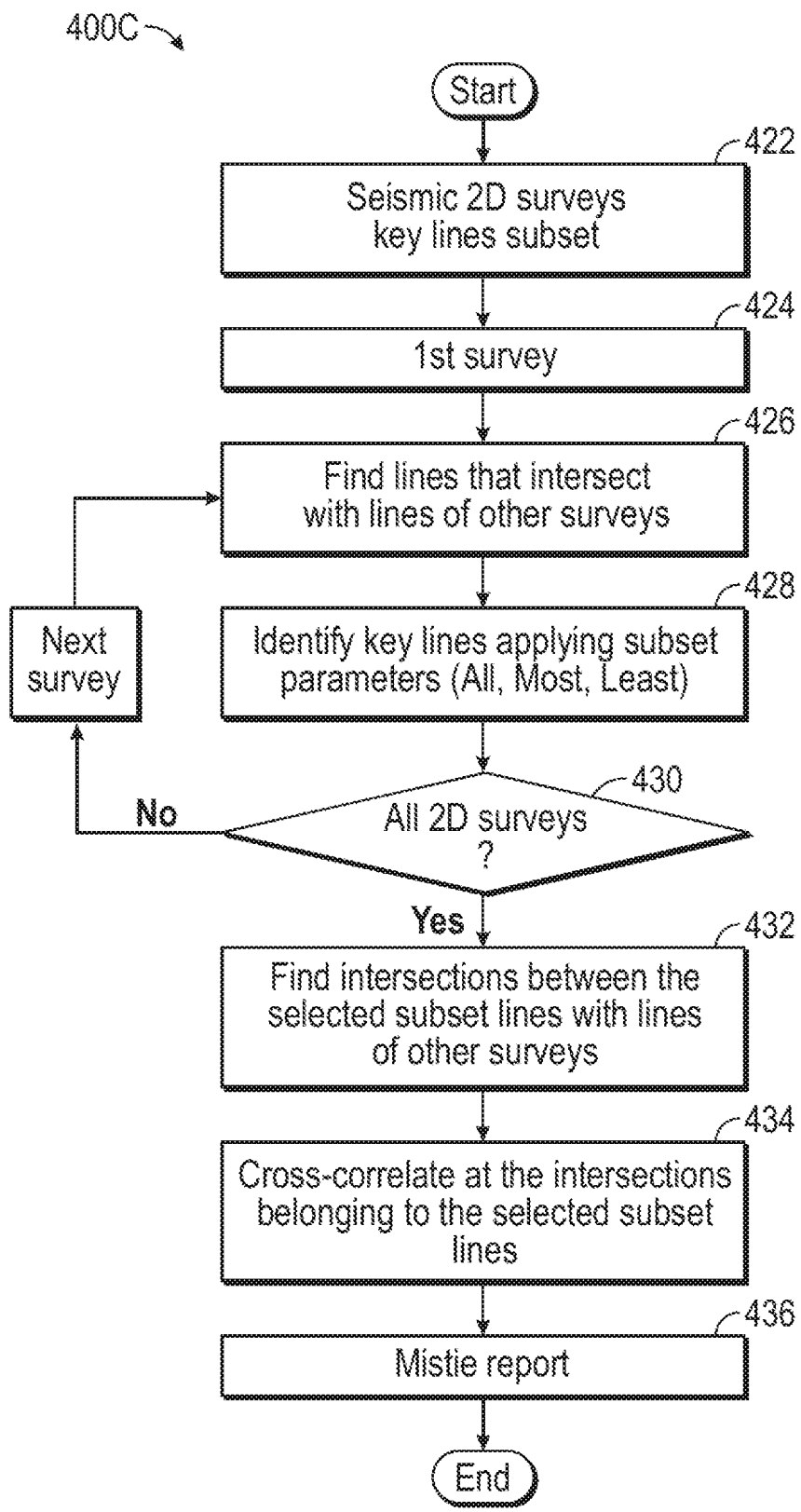
FIG. 4C is a flow chart of an illustrative method 400C for identifying misties at block 306 of method 300.

FIG. 4C is a flow chart of an illustrative method 400C for identifying misties at block 306 of method 300. Note, in this example, the method continues from block 420 of method 400A. At block 422 of method 400C, the 2D seismic surveys and key line subset previously generated/selected are again input to seismic balancer 110. At block 424, the first survey is again extracted and analyzed to identify lines that intersect with lines of different surveys at block 426. These lines will be readily identifiable from the key line subset. At block 428, seismic balance 110 then identifies key lines by applying a desired subset criteria/parameter to all the key lines identified in the key line subset (block 420). At block 430, seismic balancer 110 then determines if all surveys have been analyzed. If there are more surveys to analyze, the method loops back to block 426 and begins again. If, however, there are no more surveys, seismic balancer 110 locates the intersecting points between the key lines (selected at block 428) and the lines of other surveys, at block 432. For example, with reference to FIG. 4B, the selected key line for survey R may be line R4 which has four intersecting points.

At block 434, seismic balancer 110 cross-correlates the seismic traces from each line at an intersecting point to determine the existing misties between the two intersected lines. In signal processing, cross-correlation is a measure of similarity of two series as a function of the displacement of one relative to the other. Cross-correlation is also known as a sliding dot product or sliding inner-product. To perform cross-correlation in this example, seismic balancer 110 first identifies the intersection points between the lines. Then, at each line intersecting point, a specified number of traces are stacked. The resulting trace is compared with the equivalent stacked trace on the intersecting line as follows:

Gain—the logarithm of the rms amplitude for the two traces are calculate. The difference between these two values is the observed mistie amount in amplitude.

Shift—a cross-correlation of trace data over a given time window is performed. Then, the envelope of the cross-correlation curve is calculated. The peak of this envelope occurs at the optimum time lag, thus supplying the observed mistie in time.

Phase—the phase mistie is calculated as the instantaneous phase at the optimum time lag on the crosscorrelation envelope. This gives values between +/−180° only.

Correlation coefficient—one of the input traces are rotated by the amount of the calculated phase mistie, and shifted by the amount of the calculated time mistie. The correlation coefficient is then calculated at the midpoint of the cross-correlation window. This value that is between −1.0 and 1.0 and estimates the similarity between traces after accounting for simple phase and time shifts.

Once existing misties are identified by seismic balancer 110, a mistie report is generated at block 436. The mistie report includes key lines and the intersected lines of different surveys and the location of the intersection on each line. Additionally, the mistie report lists the observed misties in amplitude gain, time shift, and phase rotation for each line intersection and the correlation coefficient for that tie point.

With the table of observed misties as input, seismic balancer 110 uses a least-squares technique to derive the correction solution for each survey that will result in the best overall misties solution across the surveys. The illustrative embodiments described herein apply another survey's constraint by assigning all key lines of one survey and their intersecting points as an optimization set so the number of optimization sets is equal to the number of input surveys. The least-squares approach then "distributes" corrections among the optimization sets so that overall misties are minimized for all optimization sets. As a result, the survey's constraints significantly reduce the number of optimization sets and improves system computation performance.

Figure 4D:
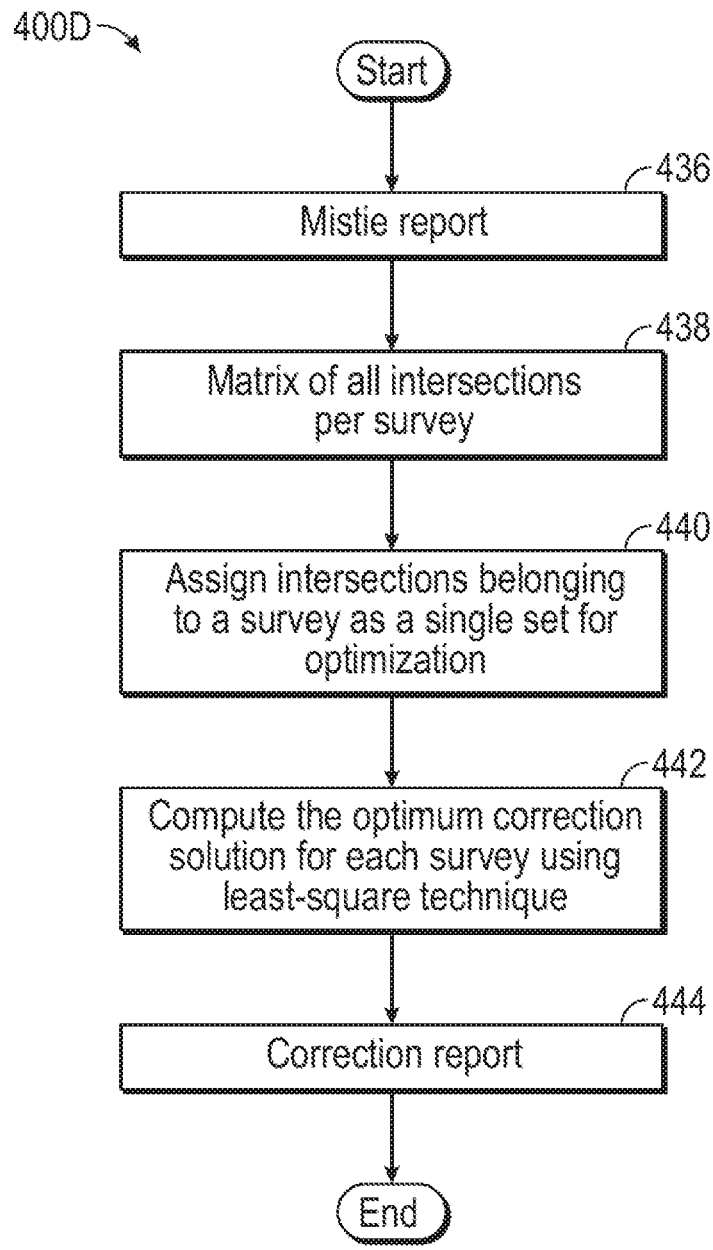
FIG. 4D is a flow chart of an illustrative method 400D for correcting misties in block 308 of method 300.

FIG. 4D is a flow chart of an illustrative method 400D for correcting misties in block 308 of method 300. At block 438, using the mistie report generated at block 436, seismic balancer 110 generates a matrix of intersecting points between the selected key lines per survey and the intersected lines of different surveys. At block 440, seismic balancer 110 assigns all key lines of one survey and their intersecting points as an optimization set. At block 442, an optimum correction solution is calculated for each survey using, for example, the least squares technique described above. As a result, a single correction solution for all the line of one survey is derived to resolve the mistie between lines of different surveys and to prevent any new misties between lines of the same survey from being introduced.

Thereafter, at block 444, a correction report containing the correction solutions is generated. The correction report may then be used seismic balancer 110 in order to correct misties between surveys and misties between lines of the different survey. Thereafter, seismic images of the corrected surveys may be produced by data visualizer 118 via GUI 130, and used to perform one or more wellbore operations.

Embodiments and methods of the present disclosure described herein further relate to any one or more of the following paragraphs:

1. A method for correcting misties across multiple two-dimensional ("2D") seismic surveys, the method comprising obtaining a plurality of seismic surveys for analysis of hydrocarbon bearing formations, wherein lines of each individual survey are acquired and processed simultaneously and at a time different from the lines of other surveys; identifying key lines for each survey as a plurality of lines of one survey that intersect with lines of a different survey; identifying intersecting points between the key lines and lines of the different survey, the intersecting points representing seismic data at an intersection of the key lines and intersected lines of the different survey; identifying misties between the key lines and intersected lines of the different survey; calculating a correction solution using only the intersecting points between the key lines and intersected lines of the different survey; and applying the correction solution to correct the misties between the key lines and intersected lines of the different survey.

2. The method as defined in paragraph 1, wherein correcting the misties comprises applying only a single correction solution to each individual survey.

3. The method as defined in paragraphs 1 or 2, wherein identifying the key lines comprises identifying lines having the least or the most number of intersecting points with lines of the different survey.

4. The method as defined in any of paragraph 1-3, wherein identifying the misties comprises cross-correlating seismic data at the intersecting points of the key lines and the intersected line of the different survey to derive the misties having at least one of a phase, gain, or shift component; and calculating the correction solution comprises: generating a matrix of intersecting points between the key lines and intersected lines of the different survey; assigning the intersecting points between the key lines and intersected lines of the different survey as an optimization set; and calculating the correction solution for the optimization set.

5. The method as defined in any of paragraph 1-4, wherein the correction solution comprises at least one of a phase, gain, or shift correction component.

6. The method as defined in any of paragraph 1-5, further comprising generating seismic images of the corrected surveys, wherein the seismic images may be used to perform a wellbore operation.

7. A system for correcting misties across multiple two-dimensional ("2D") seismic surveys, the system comprising non-transitory memory storing a plurality of seismic surveys; and one or more hardware processors coupled to the non-transitory memory and configured to execute instructions to cause the system to perform operations comprising: obtaining a plurality of seismic surveys for analysis of hydrocarbon bearing formations, wherein lines of each individual survey are acquired and processed simultaneously and at a time different from the lines of other surveys; identifying key lines for each survey as a plurality of lines of one survey that intersect with lines of a different survey; identifying intersecting points between the key lines and lines of the different survey, the intersecting points representing seismic data at an intersection of the key lines and intersected lines of the different survey; identifying misties between the key lines and intersected lines of the different survey; calculating a correction solution using only the intersecting points between the key lines and intersected lines of the different survey; and applying the correction solution to correct the misties between the key lines and intersected lines of the different survey.

8. The system as defined in paragraph 7, wherein correcting the misties comprises applying only a single correction solution to each individual survey.

9. The system as defined in paragraphs 7 or 8, wherein identifying the key lines comprises identifying lines having the least or the most number of intersecting points with lines of the different survey.

10. The system as defined in any of paragraph 7-9, wherein identifying the misties comprises cross-correlating seismic data at the intersecting points of the key lines and the intersected line of the different survey to derive the misties having at least one of a phase, gain, or shift component; and calculating the correction solution comprises: generating a matrix of intersecting points between the key lines and intersected lines of the different survey; assigning the intersecting points between the key lines and intersected lines of the different survey as an optimization set; and calculating the correction solution for the optimization set.

11. The system as defined in any of paragraph 7-10, wherein the correction solution comprises at least one of a phase, gain, or shift correction component.

12. The system as defined in any of paragraph 7-11, further comprising generating seismic images of the corrected surveys, wherein the seismic images may be used to perform a wellbore operation.

Furthermore, the illustrative methods described herein may be implemented by a system comprising processing circuitry or a non-transitory computer readable medium comprising instructions which, when executed by at least one processor, causes the processor to perform any of the methods described herein.

Although various embodiments and methods have been shown and described, the present disclosure is not limited to such embodiments and methods and will be understood to include all modifications and variations as would be apparent to one skilled in the art. Therefore, it should be understood that this disclosure is not intended to be limited to the particular forms disclosed. Rather, the intention is to cover all modifications, equivalents and alternatives falling within the spirit and scope of the disclosure as defined by the appended claims.

What is claimed is:

1. A method for correcting misties across multiple two-dimensional ("2D") seismic surveys, the method comprising:
    obtaining a plurality of seismic surveys for analysis of hydrocarbon bearing formations, wherein lines of each individual survey are acquired and processed simultaneously and at a time different from the lines of other surveys;
    identifying key lines for each survey by:
        identifying lines of one survey that intersect with lines of a different survey;
        calculating a number of intersecting points along each line, the intersecting points representing seismic data at the intersection; and
        applying a subset criteria which compares the number of intersecting points of each line, wherein the outcome of the comparison determines which line is a key line;
    identifying misties between the key lines and intersected lines of the different survey;
    calculating a correction solution using only the intersecting points between the key lines and intersected lines of the different survey; and
    applying the correction solution to correct the misties between the key lines and intersected lines of the different survey,
    wherein correcting the misties comprises applying only a single correction solution to each individual survey.

2. The method as defined in claim 1, wherein the subset criteria comprises identifying lines having:
    a threshold number of intersecting points relative to other lines;
    the least number of intersecting points with lines of the different survey; or
    the most number of intersecting points with lines of the different survey.

3. The method as defined in claim 1, wherein:
    identifying the misties comprises cross-correlating seismic data at the intersecting points of the key lines and the intersected line of the different survey to derive the misties having at least one of a phase, gain, or shift component; and
    calculating the correction solution comprises:
        generating a matrix of intersecting points between the key lines and intersected lines of the different survey;
        assigning the intersecting points between the key lines and intersected lines of the different survey as an optimization set; and
        calculating the correction solution for the optimization set.

4. The method as defined in claim 1, wherein the correction solution comprises at least one of a phase, gain, or shift correction component.

5. The method as defined in claim 1, further comprising generating seismic images of the corrected surveys, wherein the seismic images may be used to perform a wellbore operation.

6. A system for correcting misties across multiple two-dimensional ("2D") seismic surveys, the system comprising:
non-transitory memory storing a plurality of seismic surveys; and
one or more hardware processors coupled to the non-transitory memory and configured to execute instructions to cause the system to perform operations comprising:
obtaining a plurality of seismic surveys for analysis of hydrocarbon bearing formations, wherein lines of each individual survey are acquired and processed simultaneously and at a time different from the lines of other surveys;
identifying key lines for each survey by:
identifying lines of one survey that intersect with lines of a different survey;
calculating a number of intersecting points along each line, the intersecting points representing seismic data at the intersection; and
applying a subset criteria which compares the number of intersecting points of each line, wherein the outcome of the comparison determines which line is a key line;
identifying misties between the key lines and intersected lines of the different survey;
calculating a correction solution using only the intersecting points between the key lines and intersected lines of the different survey; and
applying the correction solution to correct the misties between the key lines and intersected lines of the different survey,
wherein correcting the misties comprises applying only a single correction solution to each individual survey.

7. The system as defined in claim 6, wherein the subset criteria comprises identifying lines having:
a threshold number of intersecting points relative to other lines;
the least number of intersecting points with lines of the different survey; or
the most number of intersecting points with lines of the different survey.

8. The system as defined in claim 6, wherein:
identifying the misties comprises cross-correlating seismic data at the intersecting points of the key lines and the intersected line of the different survey to derive the misties having at least one of a phase, gain, or shift component; and
calculating the correction solution comprises:
generating a matrix of intersecting points between the key lines and intersected lines of the different survey;
assigning the intersecting points between the key lines and intersected lines of the different survey as an optimization set; and
calculating the correction solution for the optimization set.

9. The system as defined in claim 6, wherein the correction solution comprises at least one of a phase, gain, or shift correction component.

10. The system as defined in claim 6, further comprising generating seismic images of the corrected surveys, wherein the seismic images may be used to perform a wellbore operation.

11. A non-transitory computer-readable medium comprising instructions which, when executed by a processor, causes the processor to perform the method comprising:
obtaining a plurality of seismic surveys for analysis of hydrocarbon bearing formations, wherein lines of each individual survey are acquired and processed simultaneously and at a time different from the lines of other surveys;
identifying key lines for each survey by:
identifying lines of one survey that intersect with lines of a different survey;
calculating a number of intersecting points along each line, the intersecting points representing seismic data at the intersection; and
applying a subset criteria which compares the number of intersecting points of each line, wherein the outcome of the comparison determines which line is a key line;
identifying misties between the key lines and intersected lines of the different survey;
calculating a correction solution using only the intersecting points between the key lines and intersected lines of the different survey; and
applying the correction solution to correct the misties between the key lines and intersected lines of the different survey,
wherein correcting the misties comprises applying only a single correction solution to each individual survey.

12. The computer-readable medium as defined in claim 11, wherein the subset criteria comprises identifying lines having:
a threshold number of intersecting points relative to other lines;
the least number of intersecting points with lines of the different survey; or
the most number of intersecting points with lines of the different survey.

13. The computer-readable medium as defined in claim 11, wherein:
identifying the misties comprises cross-correlating seismic data at the intersecting points of the key lines and the intersected line of the different survey to derive the misties having at least one of a phase, gain, or shift component; and
calculating the correction solution comprises:
generating a matrix of intersecting points between the key lines and intersected lines of the different survey;
assigning the intersecting points between the key lines and intersected lines of the different survey as an optimization set; and
calculating the correction solution for the optimization set.

14. The computer-readable medium as defined in claim 11, wherein the correction solution comprises at least one of a phase, gain, or shift correction component.

15. The computer-readable medium as defined in claim 11, further comprising generating seismic images of the corrected surveys, wherein the seismic images may be used to perform a wellbore operation.

* * * * *